Feb. 21, 1950     A. SVOBODA     2,498,312
MULTIPLYING AND DIVIDING LINKAGE
Filed April 5, 1946     9 Sheets-Sheet 1

FIG. 1

COMBINATION OF GRID GENERATOR AND TRANSFORMER LINKAGES.

INVENTOR
ANTONIN SVOBODA
BY *M. A. Hayes*
ATTORNEY

Feb. 21, 1950   A. SVOBODA   2,498,312
MULTIPLYING AND DIVIDING LINKAGE
Filed April 5, 1946   9 Sheets-Sheet 2

GRID STRUCTURE OF $X_K = X_j/X_i$

FIG. 5

INVENTOR
ANTONIN SVOBODA
BY   M. O. Hayes
ATTORNEY

Feb. 21, 1950     A. SVOBODA     2,498,312
MULTIPLYING AND DIVIDING LINKAGE Filed April 5, 1946     9 Sheets-Sheet 3

FIG. 7

INVENTOR
ANTONIN SVOBODA
BY *M. C. Hayes*
ATTORNEY

Feb. 21, 1950        A. SVOBODA        2,498,312
MULTIPLYING AND DIVIDING LINKAGE Filed April 5, 1946        9 Sheets-Sheet 4

FIG. 8

INVENTOR
ANTONIN SVOBODA
BY
ATTORNEY

UNITED STATES PATENT OFFICE 2,498,312

MULTIPLYING AND DIVIDING LINKAGE

Antonin Svoboda, Cambridge, Mass.

Application April 5, 1946, Serial No. 659,713

4 Claims. (Cl. 235—61)

This invention relates to a computing device and more particularly to a computing device for solving a predetermined function of two independent variables.

Computers heretofore known in the art normally are of bulky construction and are expensive to manufacture. This invention provides a computing device which is both economical to manufacture and which is economical of space.

For general information purposes in connection with the present invention, reference is made to the textbook, Computing Mechanisms and Linkages, vol. 27, by Antonin Svoboda, Massachusetts Institute of Technology, Radiation Laboratory Series, First Edition 1948, McGraw-Hill Book Company, Inc.

An object of this invention is to provide a novel computing device for solving a predetermined function of two independent variables.

Another object of this invention is to provide a novel bar linkage mechanism for solving a predetermined function of two independent variables.

A further object of this invention is to provide a novel linkage mechanism for solving a predetermined function of two independent variables consisting of three links pivotally connected at a common point, together with constraining means operatively connected to the free ends of said links for guiding said free ends adjacent suitable scales, the relative lengths of said links and orientation of said constraining means being such that movement of one of said links is proportional to said predetermined function in response to movement of either of the other of said links.

These and other objects of this invention will be apparent from the following specification and claims in connection with the accompanying drawings in which:

Fig. 10 is the grid structure of the relation $$x_1 = \frac{x_3}{x_2}$$

developed about the center $x_2 = x_3 = 1$.

A computer constructed according to the principles of this invention consists of a mechanism with two degrees of freedom and at least one output parameter, $X_k$, functionally related to two input parameters, $X_i$ and $X_j$; thus $$X_k = F(X_i, X_j) \tag{1}$$

To such mechanism may be added functional scales that establish relations between the parameters $X_i$, $X_j$, $X_k$ and corresponding variables $x_i$, $x_j$, $x_k$, respectively. The mechanism will then serve to establish a functional relation $$x_k = f(x_i, x_j) \tag{2}$$

between these variables. The device, including mechanism and scales, then mechanizes Equation 2. If this relation of the variables is to be single-valued, it is necessary that to definite values of the input variables there correspond definite values of the input parameters, and that to a definite value of the output parameter there correspond a definite value of the output variable. The scales must then establish relations of the form, $$\left. \begin{array}{l} X_i = (X_i | x_i).x_i \\ X_j = (X_j | x_j).x_j \\ x_k = (x_k | X_k).X_k \end{array} \right\} \tag{3}$$

where all three operators (but not necessarily their inverse operators) are single valued. If Equations 3 are of linear form $$\left. \begin{array}{l} X_i = X_i^{(0)} + k_i(x_i - x_i^{(0)}) \\ X_j = X_j^{(0)} + k_j(x_j - x_j^{(0)}) \\ x_k = x_k^{(0)} + K_k(X_k - X_k^{(0)}) \end{array} \right\} \tag{4}$$

the device provides a "linear mechanization" of Equation 2, i. e., a mechanization wherein all scales are linear in nature.

Bar linkages which mechanize functions of two independent variables as contemplated by this invention have the advantage of being flat and small, of giving smooth frictionless performance allowing appreciable feedback, and of being relatively inexpensive to manufacture.

The term "topological transformation" as used herein refers to the property of a complex variable whereby a system of curves may be transformed from one plane into another, while retaining certain properties. This property is similar in nature to the property known as conformal mapping, although topological transformation is somewhat more general in scope. Discussion of conformal mapping may be found in textbooks of higher mathematics, and the technique has been conveniently applied in hydrodynamic and aerodynamic problems. Three references explaining the nature of conformal mapping are submitted: Sec. 142, page 465 of Higher Mathmatics for Engineers and Physicists, I. S. and E. S. Sokolnikoff, McGraw-Hill, second edition, 1941; chapter 10, page 89, of Aerodynamic Theory, volume 1, William F. Durand; and, Chapter IV, Hydrodynamics, 6th Edition, Sir Horace Lamb, Cambridge University Press (London), 1932. The mathematical nomenclature used in the following discussion is substantially the same as that employed in the discussion of conformal mapping or conformal transformation in the aforementioned references.

Simple bar linkages can generate only a rather restricted class of functions so that in order to mechanize a given functional relation it usually becomes necessary to use one or more simple linkages of two degrees of freedom combined with linkages of one degree of freedom. A schematic diagram of a grid generator and transformer linkage system is shown in Fig. 1.

Figure 1:
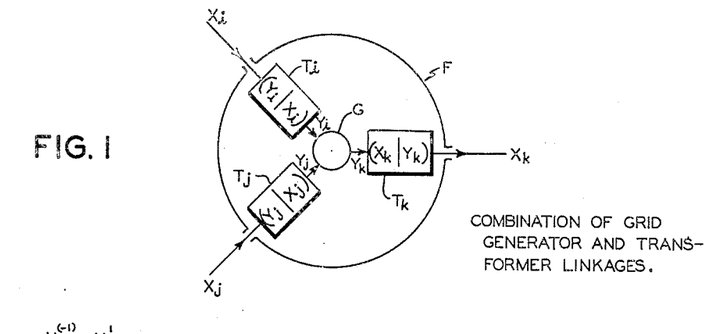
Fig. 1 is a schematic diagram of a grid generator and transformer linkage as contemplated by this invention.

Referring to Fig. 1, let G denote a simple bar linkage with two degrees of freedom, generating a function of two independent parameters $$Y_k = G(Y_i Y_j) \quad (5)$$

of a predetermined class. By combining such a linkage with three linkages having one degree of freedom, as shown schematically in Fig. 1, it is possible to generate relations of a wide class between parameters $X_i$, $X_j$, $X_k$.

By considering structures consisting of a linkage with two degrees of freedom, which establishes a relation (Equation 5) between internal parameters $Y_i$, $Y_j$, $Y_k$ and three linkages of one degree of freedom, which relate the internal parameters to the corresponding external parameters $X_i$, $X_j$, $X_k$;

$$\begin{aligned} Y_i &= (Y_i | X_i).X_i \\ Y_j &= (Y_j | X_j).X_j \\ X_k &= (X_k | Y_k).Y_k \end{aligned} \quad (6)$$

Together, these establish a relation between the external parameters (Equation 1); the functional scales, in turn convert this into a relation (Equation 2) between variables $x_i$, $x_j$, $x_k$, which is to be made to approximate as closely as possible to some given relation throughout a specified range of operation (domain).

The linkage G, with two degrees of freedom shall be referred to as the "grid generator." The linkages $T_i$, $T_j$, $T_k$ shall be referred to as "transformers," since they transform the internal parameters Y into external parameters X.

The division of a mechanism into a "grid generator" and "transformers" is arbitrary; the breakdown of a given functional relation (Equation 1) into a grid generator relation (Equation 5) and transformer relations (Equation 6) is also arbitrary. The term "grid generator for a given function" shall therefore be used to denote any linkage with two degrees of freedom which will serve as the linkage G in a mechanization of a given function. By "degrees of freedom" is meant the minimum number of independent variables necessary to specify a given mechanical configuration.

Transformer linkages increase the field of linearly mechanizable functions, but not the field of functions mechanizable in the more general sense. A relation $x_k = f(x_i, x_j)$ mechanized by a grid generator (Equation 5), transformer linkages (Equation 6) and functional scales (Equation 3) can be mechanized also by associating the same grid generator directly with scales which establish relations.

$$\begin{aligned} Y_i &= (Y_i | X_i).(X_i | x_i).x_i = \phi_i(x_i) \\ Y_j &= (Y_j | X_j).(X_j | x_j).x_j = \phi_j(x_j) \\ x_k &= (x_k | X_k).(X_k | Y_k).Y_k = \phi_k(Y_k) \end{aligned} \quad (7)$$

Transformer linkages in a design thus serve only to change the form of the functional scales—usually to make them linear. A very simple grid generator may be used if the transformers are sufficiently complex, while another choice of grid generators may make unnecessary the use of one or more transformers.

A formal characterization of all functional relations which can be mechanized by use of a given grid generator will now be presented. Combining Equations 5 and 7, it is apparent that these relations may be expressed as $$x_k = f(x_i, x_j) = \phi_k(G[\phi_i(x_i), \phi_j(x_j)]) \quad (8)$$

where G is the given grid generator function and $\phi_i$, $\phi_j$, $\phi_k$ are arbitrary single valued functions of their arguments. Conversely, to mechanize a given functional relation $$x_k = f(x_i, x_j) \quad (2)$$

a grid generator can be employed mechanizing any function of the form $$Y_k = G(Y_i, Y_j) = \phi_k^{-1}\{f[\phi_i^{-1}(Y_i), \phi_j^{-1}(Y_j)]\} \quad (9)$$

where $\phi_i^{-1}$, $\phi_j^{-1}$, $\phi_k^{-1}$, are the inverse of the arbitrary single-valued functions $\phi_i$, $\phi_j$, $\phi_k$, which characterize the transformer linkages of the mechanism.

Figure 2:
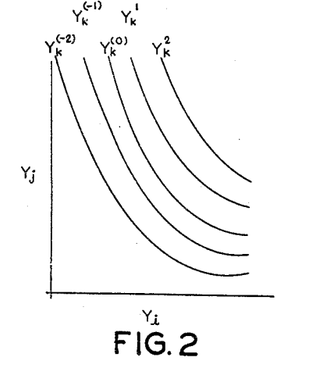
Fig. 2 illustrates a topological transformation into contours of the functions F and G represented in Equation 5 of the specification.
Figure 3:
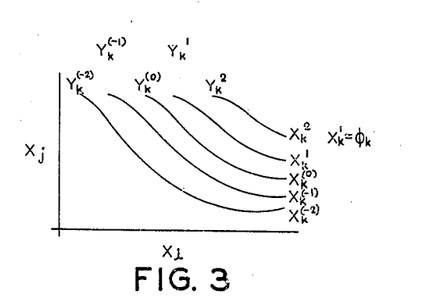
Fig. 3 illustrates a topological transformation into contours of the functions F and G expressed in Equation 6 of the specification.

These relations expressed in Equations 8 and 9 may also be expressed in terms of contour lines of the functions $f$ and $G$. Let contours of constants $Y_k = G(Y_i, Y_j)$ be laid out in the $(Y_i Y_j)$ plane and labelled with the corresponding values of $Y_k$ as shown in Fig. 2. Now a change may be introduced in the independent variables defined by the equations $$\begin{aligned} Y_i &= \phi_i(x_i) \\ Y_j &= \phi_j(x_j) \end{aligned} \quad (10)$$

where $\phi_i$ and $\phi_j$ are single-valued functions of these arguments. Replotting the contours of G in the $(x_i, x_j)$ plane, Fig. 3, lines of constant $f(x_i, x_j)$, as defined by Equation 8 are obtained. If those contours are relabeled with values of $x_k$ given by $$x_k^{(r)} = \phi_k[Y_k^{(r)}] \quad (11)$$

they will represent the functional relation $$x_k = f(x_i, x_j) \quad (12)$$

defined by Equation 8, for a particular choice of the functions $\phi_i$, $\phi_j$, $\phi_k$. It is thus clear that a given grid generator can be used in mechanizing a given function of the contours of constant $G(Y_i, Y_j)$ can be transformed into those of constants $f(x_i, x_j)$ or conversely, by any topographical transformation of the form of Equation 10, with relabeling of the contours according to Equation 11.

While formal relations such as Equations 8 and 9 have been demonstrated, the graphic presentation of these relations through contour lines is of more interest. What is particularly of interest is a means of characterizing given functions, on the one hand, and available grid generators, on the other hand, which will make it clear at once whether or not a given grid generator can be used in mechanizing a given function. In this connection, the idea of "grid structure of a function" is of fundamental importance.

Figure 4:
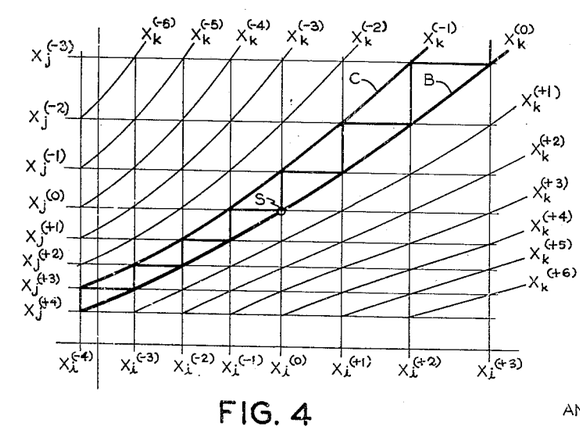
Fig. 4 is a diagram of an ideal grid structure as contemplated by this invention.

The representation of a function of two independent variables by a grid structure is an extension of the representation by a set of contours of constant value of the dependent variable. In order to construct a grid structure, for example of a functional relation $$x_k = f(x_j, x_j) \quad (13)$$

defined through a range of operation (domain D) in the $(x_i, x_j)$ plane, see Fig. 4 which is a diagram of an ideal grid structure of the function $$x_k = f(x_i, x_j)$$

Let S be a point in the domain D, associated with values of the variables which are denoted by $x_i^{(0)}$, $x_j^{(0)}$, $x_k^{(0)}$; this is to serve as the "center" of the grid structure. Through S construct the contour B of constant $x_k$, $$x_k^{(0)} = f(x_i, x_j) \quad (14)$$

See Fig. 4. Next choose an adjacent contour C, defined by $$x_k = x_k^{(-1)} \quad (15)$$

This, together with point S, will fix the grid structure which is to be constructed.

Through S construct the vertical line $x_i = x_i^{(0)}$, intersecting the contour C at the point $$(x_i^{(0)}, x_j^{(-1)}, x_k^{(-1)})$$

Through this latter point construct the horizontal line $x_j = x_j^{(-1)}$ intersecting the contour B at the point $(x_i^{(1)}, x_j^{(-1)}, x_k^{(0)})$. Through this point, in turn, construct the vertical line $x_i = x_i^{(1)}$, intersecting the contour C at the point $x_i^{(1)}, x_j^{(-2)}$, $x_k^{(-1)}$. Continuing thus to extend the steplike structure of lines between the two contours, both above and below S, the sequences of values of the two independent variables:

$$x_i^{(-2)}, x_i^{(-1)}, x_i^{(0)}, x_i^{(1)}, x_i^{(2)}$$
$$x_j^{(-2)}, x_j^{(-1)}, x_j^{(0)}, x_j^{(1)}, x_j^{(2)}$$

are defined.

The rectangular grid of lines $$x_i = x_i^{(r)} \quad (16)$$

and $$x_j = x_j^{(s)} \quad (17)$$

will cover part, but not always all, of the domain D.

This rectangular grid can now be used to define a system of contours $$x_k = x_k^{(t)} \quad (18)$$

which, together with the grid itself, will make up the "rectangular grid structure of the function," defined with respect to a center S and a contour C.

The rectangular grid has been so constructed, and its lines so numbered, that a single contour $$x_k = x_k^{(0)} \quad (19a)$$

passes through all grid intersections for which $$r+s = 0 \quad (19b)$$

and a single contour $$x_k = x_k^{(-1)} \quad (20a)$$

passes through all grid intersections for which $$r+s = -1 \quad (20b)$$

There is a class of functions such that, no matter how the center S and the contour C are chosen, there will be a single contour $$x_k = x_k^{(t)} \quad (18)$$

passing through all grid intersections for which $$r+s = t \quad (21)$$

$t$ being any integer, positive or negative. Such a function is said to have "ideal grid structure."

An ideal grid structure (defined with respect to a center S and a contour C) will consist of the rectangular grid specified above, plus all the contours $x_k$ which pass through the intersections of the grid. Such a grid structure appears as shown in Fig. 4.

It is also possible to describe this grid structure as consisting of three families of curves, given by Equations 16, 17, and 18, such that through every point of intersection there passes a curve of each family.

As heretofore shown, the topological transformation $$Y_i = \phi_i(x_i) \quad (7)$$
$$Y_j = \phi_j(x_j)$$

carries contours of the function $$Y_k = G(y_i, y_j) \quad (3)$$

in the $(Y_i, Y_j)$ plane into contours of the function $$x_k = f(x_i, x_j) \quad (12)$$

in the $(x_i, x_j)$ plane. It is obvious that it will carry vertical straight lines in the $(Y_i, Y_j)$ plane into vertical straight lines in the $(x_i, x_j)$ plane, and horizontal straight lines into horizontal straight lines. Indeed, the idea of a grid structure has been so defined that if this transformation carries a center $S_Y$ in the $(Y_i, Y_j)$ plane into a center $S_X$ in the $(x_i, x_j)$ plane, and a contour $C_Y$ into a contour $C_X$, then it carries the complete grid structure of the function $G(Y_i, Y_j)$, defined with respect to $S_Y$ and $C_Y$, into the grid structure of the function $f(x_i, x_j)$, defined with respect to $S_X$ and $C_X$. The values of the variables associated with the grid lines and contours will be transformed according to Equations 10 and 11, but the indices $r$, $s$, $t$, will be unchanged.

It is apparent from the foregoing that a given grid generator can be used in the exact mechanization of a given function if, and only if, there exists a topological transformation, of the form of Equation 7, which carries each grid structure of the function $G(Y_i, Y_j)$ into a corresponding grid structure of the given function $f(x_i, x_j)$. In practice, however, it is only necessary to show that some grid structure of the function $G(Y_i, Y_j)$ with sufficiently small meshes, can be thus transformed into a corresponding grid structure of the function $f(x_i, x_j)$ with errors within specified tolerances.

From the foregoing discussion, it is apparent that the grid structure of a functional relation $$x_k = f(x_i, x_j) \quad (12)$$

has been defined as a system of lines in the $(x_i, x_j)$ plane: straight lines representing constant values of $x_i$ and $x_j$, which form a rectangular grid, and a superimposed family of contours of constant $x_k$.

By using grid structures and topological transformations as explained which serve as an intersection nomogram representing a given function, such a function can be mechanized. That is to say, such topological transformations of grid structures are employed for mechanizing functions of two independent variables.

Figure 5:
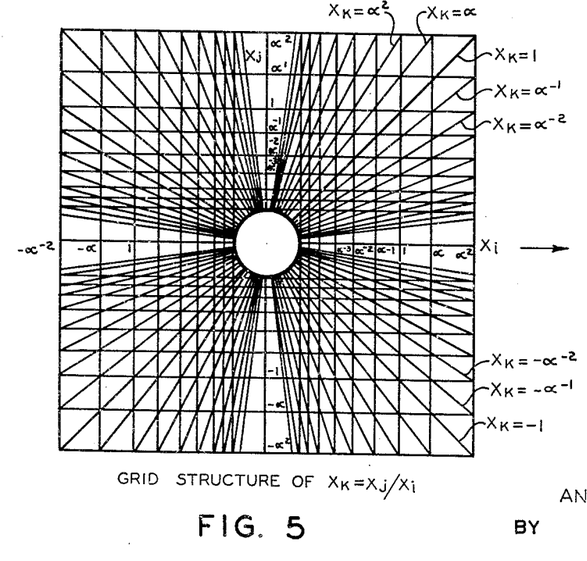
Fig. 5 is a diagram of a grid structure of the function $$x_k = \frac{x_j}{x_i} \text{ or } x_j = x_k x_i$$
Figure 6:
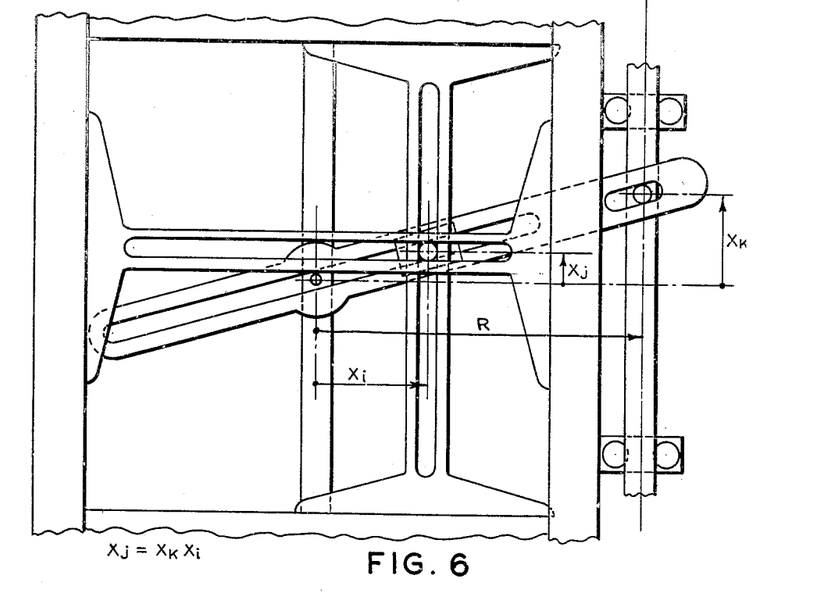
Fig. 6 illustrates a mechanization of the grid structure of Fig. 5.

Consider, for example, the grid structure of the relation $$x_k = x_j / x_i \qquad (22)$$

as shown in Fig. 5. The spacings of the rectangular grid lines change in geometrical sequence; the fixed ratio being 1.25. The contours of constant $x_k$ are radial lines; corresponding value of $x_k$ for each line is the value of $x_j$ at its intersection with the vertical line $x_i = 1$. At each point of this figure it is possible to read off corresponding values of $x_i$, $x_j$, and $x_k$ satisfying Equation 22. To mechanize this function consider three links pivotally connected at one end thereof at a common point by means of a pin. The three free ends are each constrained by any suitable constraining means to move adjacent three different scales in response to movement of the common point of connection of the three links. If these linkages and scales are so arranged that one can read on the first scale the value of $x_i$ at the position of the pin, on the second scale the value of $x_j$, and on the third scale the value of $x_k$, then the device provides a mechanization of the given function. In the present case, the first scale should show the horizontal displacement of the pin from the origin, the second scale its vertical displacement; the reading of the third scale should lie proportional to the vertical displacement of the intersection of the radial line through the pin with a vertical line. The divider (or multiplier) of Fig. 6 accomplishes this, it being the natural mechanization of the grid structure of Fig. 5. The action of the linkage of Fig. 6 is based on the proportionality of the sides of two similar triangles. These are triangles with horizontal bases, and vertices at the central pin; the first has a base of length R and altitude $X_k$, the second a base of length $X_i$ and altitude $X_j$. Thus $$\frac{R}{X_k} = \frac{X_i}{X_j}$$

or $$R X_j = X_k X_i$$

thus establishing a multiplication function, where R is a constant that depends on the type of the multiplier and its dimensions. The slide multiplier of Fig. 6 is a schematic rather than a practical design; however, since the lengths of the sliding surfaces as shown are not great enough to prevent self-locking in all possible positions of the mechanism.

Figure 7:
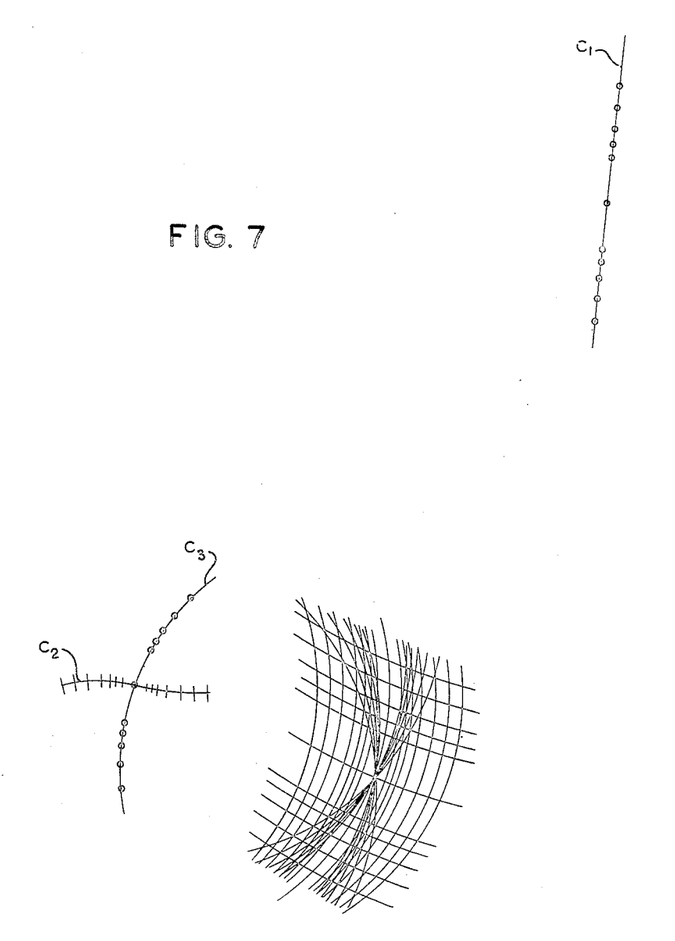
Fig. 7 is a topological transformation of the grid structure of Fig. 5.

A topological transformation of this grid structure will carry it into a form (Fig. 7) suggesting a very different type of mechanization. The horizontal lines of Fig. 5 are transformed into a family of circles, all of the same radius $L_1$ with centers lying on a straight line $C_1$. The vertical lines of Fig. 5 are transformed into a second family of circles, all of the same radius, $L_2$, with centers lying on the curved line $C_2$. Finally, the radial lines of Fig. 5 are transformed into a third family of curves. These are very nearly although not exactly, circles with the same radius, $L_3$; since the approximate circles intersect at a common point their centers must lie on another circle with radius $L_3$—curve $C_3$ in the figure.

Figure 8:
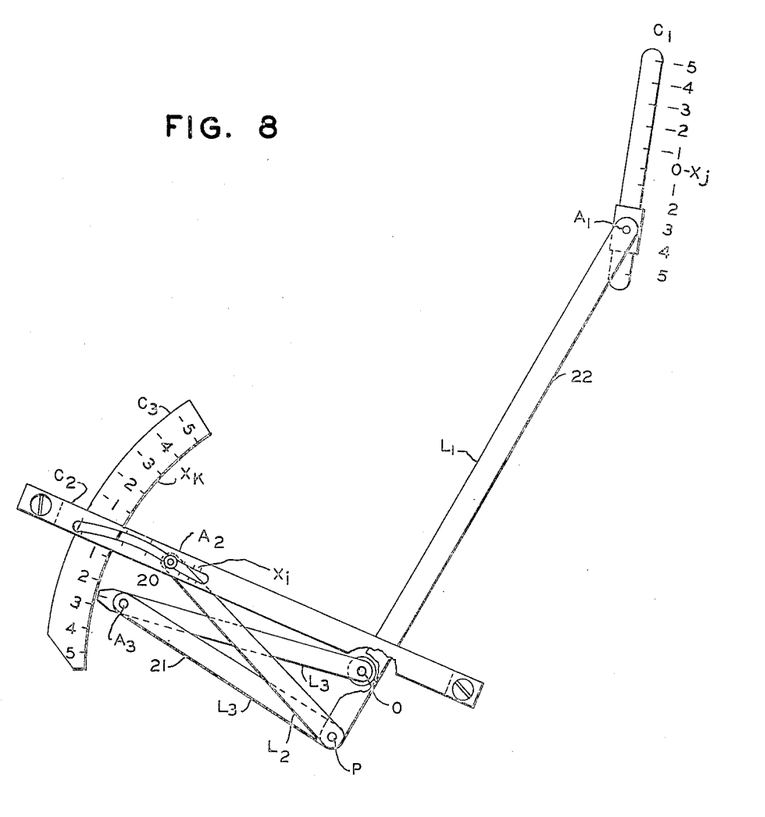
Fig. 8 is a mechanization of the grid structure of Fig. 7.

Ignoring the small deviation from circular form of the curves of the third family, the mechanization shown in Fig. 8 results. This is an approximate, but quite accurate multiplier or divider. The joint P can be made to lie on a circle of the first family by placing it at one end of a bar $PA_1$ with length $L_1$, and fixing the joint $A_1$ in the center of this circle, on line $C_1$. Conversely, if the joint $A_1$ is constrained to lie on the line $C_1$, as by being pivoted to a slide, it will necessarily be always at the center of the $x_j$ circle on which P lies. A scale placed along $C_1$ can thus be calibrated to give the value of $x_j$ at the position of pin P. In the same way, the value of $x_i$ can be read on a scale lying along the curved line $C_2$ using as index the point $A_2$ connected to the pin by a bar of length $L_2$. Finally, values of the quotient $x_k$ can be read on the circular scale $C_3$. Instead of pivoting the bar $PA_3$, of length $L_3$, to a circular slide, it is possible to constrain the point $A_3$ to lie on the curve $C_3$ by a second bar $OA_3$, also of length $L_3$, pivoted at the center of this circle. As shown in the figure, the index point has been transferred to this second bar in an obvious way.

As shown the computer for solving the function $x_k = x_j / x_i$ disclosed in Fig. 8 comprises a star linkage consisting of three links 20, 21, and 22 having one end of each pivotally connected at a common point P. Constraining means as heretofore explained are provided at the free ends of links 20, 21, and 22 to cause said ends to follow scales calibrated in correspondence with the grid structure of Fig. 7 to indicate values of $x_k$, $x_j$, and $x_i$ corresponding to the function $x_k = x_j / x_i$.

To avoid the use of a curved slide, and the nonlinearity of the $x_i$ and $x_k$ scales, a more satisfactory way for guiding point $A_2$ along the curve $C_2$ may be devised and the $x_k$ scale and $x_i$ scale readings may be linearized by transformer linkages, such as harmonic transformers or three-bar linkages.

Figure 9:
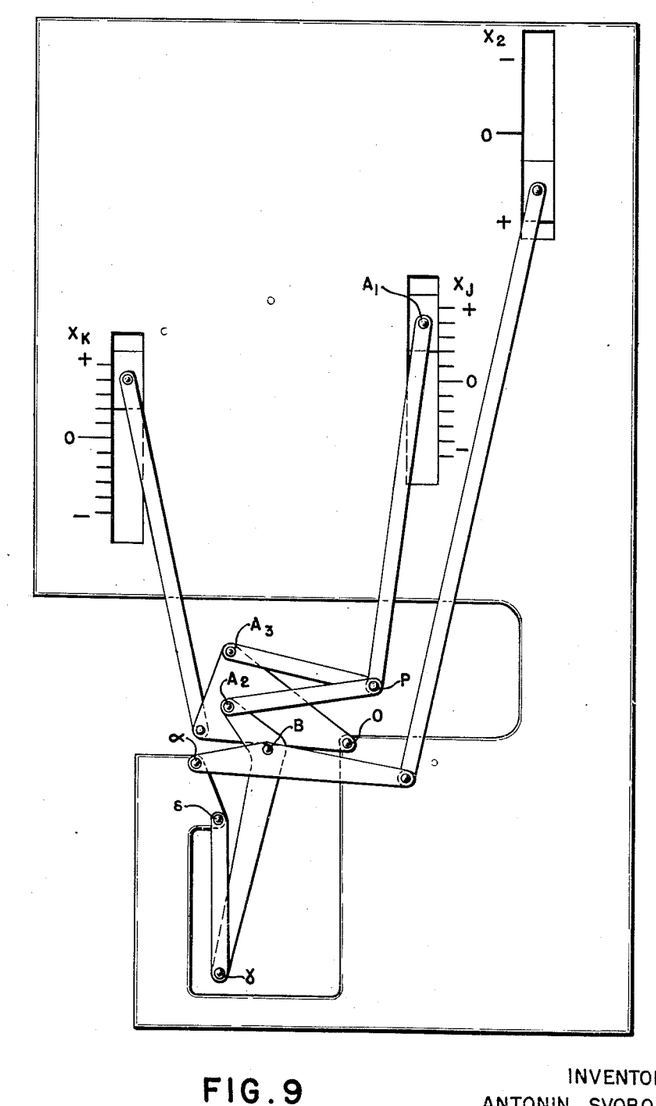
Fig. 9 illustrates a modification of Fig. 8 having transformer means for linearizing the readings of the scales of Fig. 8.

This may be accomplished as shown in Fig. 9 which shows the first linkage multiplier so designed as to lie operable through a domain including positive and negative values of all variables. The point $A_2$ is constrained to follow the curve $C_2$ of Fig. 8 by placing it on an extension of the central bar of a three-bar linkage $\alpha \beta \gamma \delta$. Motion of $A_2$ along $C_2$ produces a corresponding rotation of the bar $\alpha \beta$ of the three-bar linkage. A harmonic transformer converts this rotation into linearized readings on the $x_i$ scale. To linearize the $x_k$ scale, the rotation of the bar $OA_3$ is converted into linear motion of a slide by means of a harmonic transformer. A complete discussion of the apparatus of Fig. 9 will be found in co-pending application No. 658,598, filed April 1, 1946.

By using the system outlined in the foregoing discussion, a star linkage can be used in designing a multiplier mechanizing the relation $$x_1 = \frac{x_3}{x_2}$$

Figure 10:
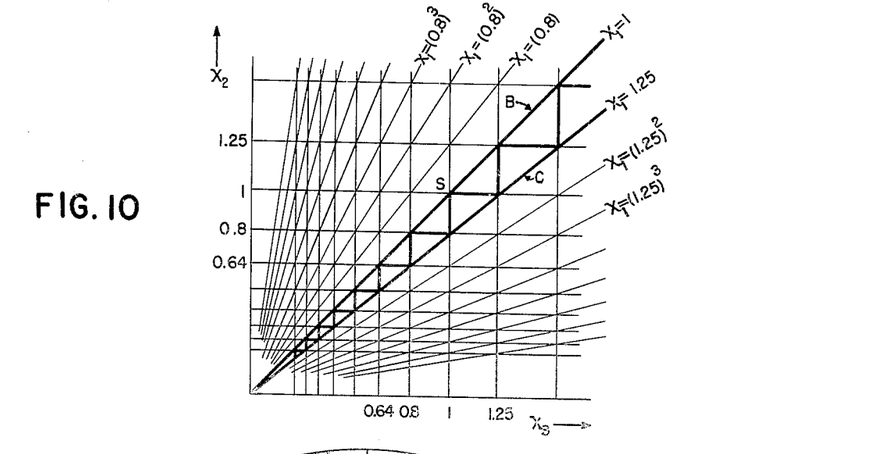

In Fig. 10 the grid structure for this relation is developed about the center $x_2 = x_3 = 1$, with the line $x_1 = 1.25$ chosen as the contour C. The step structure between the contours B and C approaches the origin in an infinite number of steps. The grid is ideal, and includes the contours $x_1 = (1.25)^r$, with $r$ taking on all integral values; as $r \to \infty$ these contours approach the horizontal axis, and as $r \to -\infty$ they approach the vertical axis.

To obtain grid structures for this relation in all four quadrants (i. e., to obtain negative values of $x_1$, $x_2$ and $x_3$) it is necessary to use a separate center for the grid structure in each quadrant. If these four points are chosen in similar positions in the four quadrants, symmetrical with respect to the two axes, and if corresponding contours C are used, then the four grid structures will approach the coordinate axes symmetrically. They will then appear to flow smoothly into each other in crossing these axes, and the whole figure will take on the appearance of the single grid structure shown in Fig. 11. It is important to remember that this result is obtained artificially, and that the coordinate axes are lines of condensation in the grid structure.

Figure 11:
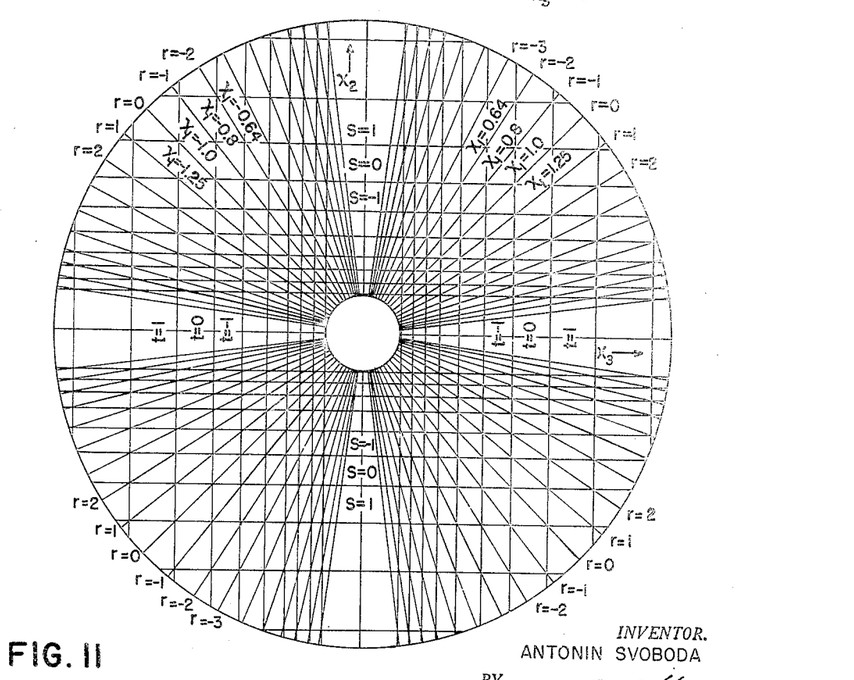
Fig. 11 is a grid structure combining the grid structure of Fig. 10 into four quadrants.

To construct a mechanism from this grid structure, it is necessary to transform the grid structure of Fig. 11 (Cartesian coordinates $x_2$, $x_3$) into an ideal grid structure in which each of the three families of straight lines in the original structure is represented by a family of congruent circles (Cartesian coordinates $y_2$, $y_3$).

Consider first the family of lines of constant $x_1$. In the original grid structure, all these lines intersect at a common point O. Such a property will not be changed by a topological transformation; in the transformed grid structure, the corresponding family of circles of radius L must all intersect at a common point O' (see Fig. 12). It follows that the centers of these circles must all lie on a circular arc $ab$ with radius $L_1$ and center at O'. The radius $L_1$ can be chosen at will, as the problem is independent of the scale of construction; it is usually convenient to take $L_1$ as the unit of length.

The relation between a given straight line of the original grid structure and the circle into which it is transformed may be established by examining the topological transformation in the neighborhood of the origin O. In its general form this transformation is $$x_2 = \psi_2(y_2, y_3) \atop x_3 = \psi_3(y_2, y_3) \quad (23)$$

Figure 12:
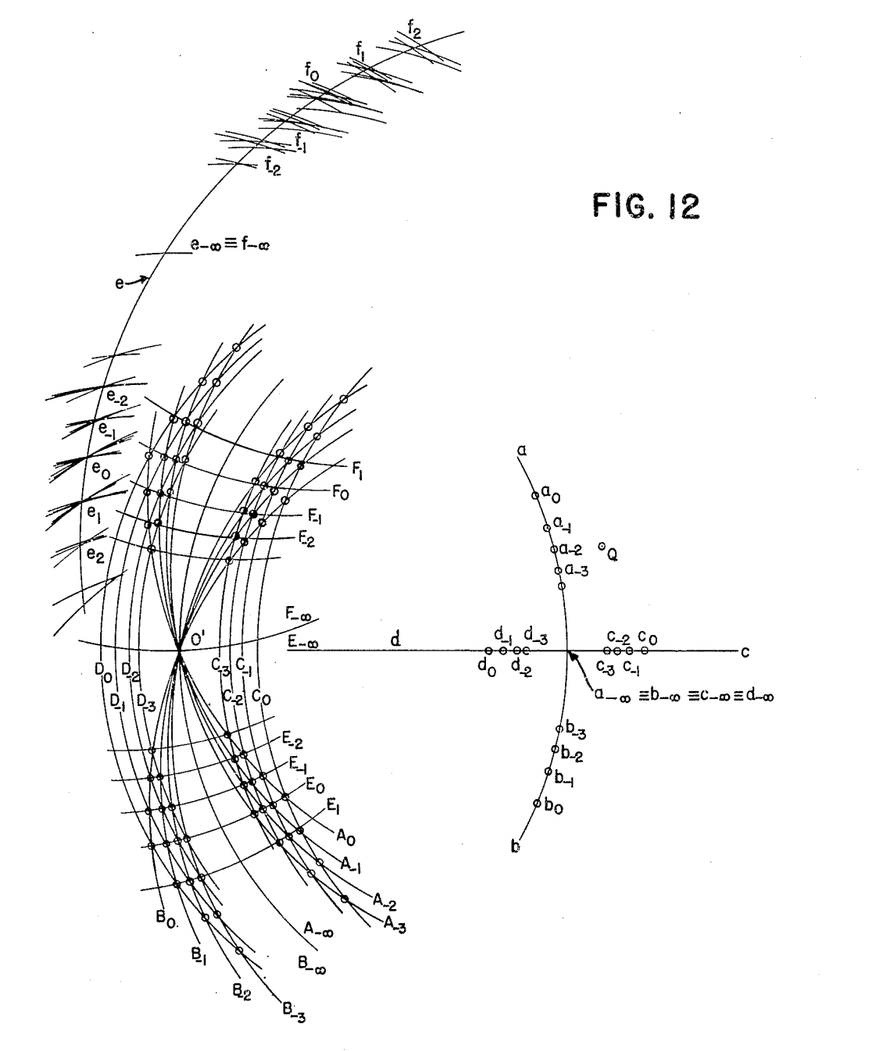
Fig. 12 is a topological transformation of the grid structure of Fig. 11.

In the neighborhood of O, where all variables can be treated as small quantities, this reduces to $$x_2 = c_{22}y_2 + c_{23}y_3 \atop x_3 = c_{32}y_3 + c_{33}y_3 \quad (24)$$

on neglect of small quantities of the second order. If it is assumed that the transformed grid structure is symmetrical with respect to the horizontal axis, in the neighborhood of the origin, then $$c_{23} = c_{32} = 0 \quad (25)$$

and $$\frac{x_3}{x_2} = \frac{c_{33}y_3}{c_{22}y_2} \quad (26)$$

in the immediate neighborhood of O. In other words, a line of slope $x_1$ at the origin O of the original grid structure is transformed into a curve through the origin O' with the slope changed by the constant factor $(c_{33}/c_{22})$. Since the slopes of the succession $x_1$-contours in Fig. 11 change in a geometric progression, the slopes at O' of the corresponding circles must also change in geometric progression, and by the same ratio (1.25). This is true also of the slopes of the radii from the origin O' to the centers of these circles which are the negative reciprocals of the slopes of the circles themselves. By choosing one arbitrary value of $c_{33}/c_{22}$, there can be constructed in the transformed grid structure, circles corresponding to each of the lines of constant $x_1$ in the original grid structure. In Fig. 12 there are indicated four of these circles ($A_0$, $A_{-1}$, $A_{-2}$, $A_{-3}$) with centers above the horizontal axis $dc$ at points $a_0$, $a_{-1}$, $a_{-2}$, $a_{-3}$; the distinguishing subscripts being the $r$ values of the original grid lines, which lie in the second and fourth quadrants of Fig. 11. The corresponding lines in the first and third quadrants transform into the circles $B_0$, $B_{-1}$, $B_{-2}$, $B_{-3}$, with centers $b_0$, $b_{-1}$, $b_{-2}$, $b_{-3}$, which are the mirror images of $a_0$, $a_{-1}$, $a_{-2}$, $a_{-3}$, in the horizontal axis $dc$. The sequence of points $a_0$, $a_{-1}$, $a_{-2}$, ..., which lies in the domain of positive $x_1$ has a point of condensation $a_{-\infty}$ on the horizontal axis; an extension of the $x_1$-scale into the domain of negative $x_1$ is provided by the symmetrically placed sequence $b_0$, $b_{-1}$ ..., which has the same point of condensation. This point is the center of the circle into which the vertical axis of the original grid structure is transformed.

Consideration of this family of circles will make it clear that there exists no topological transformation of the type under discussion which maps the complete ($x_2$, $x_3$)-plane onto the ($y_2$, $y_3$)-plane. The original contours of constant $x_1$ intersect only at the origin and at infinity, but the circles into which it is herein attempted to transform them may intersect anywhere in the ($y_2$, $y_3$)-plane, if arbitrarily large values of $r$ or $x_1$ are admitted. At best, it is only possible to establish a topological transformation that carries a portion of the original structure into a grid structure consisting of arcs of circles.

Consideration is next required of the family of circles of constant $x_3$. Since the original lines $x_3 = c$ were symmetrical with respect to the horizontal axis, it is natural to give the transformed circles similar symmetry; their centers must lie on the horizontal axis $cd$. The vertical axis $x=0$ is already known to be transformed into a circle $A_{-\infty}$ of radius $L_1$ with center at $a_{-\infty}$. It follows that this second family of circles must have the same radius as the first: $L_3 = L_1$. Since the lines $x_3 = x_3^{(t)}$ converge on $x_3 = 0$ as $t \to \infty$, the point $a_{-\infty}$ must be a point of condensation on the $x_3$ scale as well as on the $x_1$ scale. The lines of the original grid intersect the $x_3$ axis at $x_3^{(t)}$; the transformed circles must intersect the $y_3$-axis at points determined by $$x_3^{(t)} = \psi(O, y_3^{(t)}) \quad (27)$$

or, in the immediate neighborhood of O', by $$x_3^{(t)} = c_{33}y_3^{(t)} \quad (28)$$

The values of $x_3^{(t)}$ go to zero in a geometrical progression (ratio 1.25) as $t \to -\infty$. It follows that the sequence of values $y_3^{(t)}$ approaches zero, and the centers of the $x_3$ approach $a_{-\infty}$, in a similar progression as $t \to -\infty$. As a first attempt to find a transformation of the desired character, let it be assumed that this geometrical progression is exact, rather than an approximation valid only in the neighborhood of O'; that is, assume that Equation 28 is valid for all values of $t$. Then, after an arbitrary value of $c_{33}$ is chosen, a circle corresponding to any $x_3$-line of the original grid structure can be constructed. In Fig. 12 are shown eight of these circles with centers $c_0$, $c_{-1}$, $c_{-2}$, $c_{-3}$, and $d_0$, $d_{-1}$, $d_{-2}$, $d_{-3}$. (The subscript is the index $t$.) The $c$'s lie in the domain of positive $x_3$, and have a condensation point at $x_3=0$; the $d$'s provide, somewhat artificially, an extension of the scale into the domain of negative $x_3$.

The assumptions made up to this point (transformation of the $x_1$- and $x_3$-contours into families of circles symmetrical to the horizontal axis, validity of Equation 27, and special values of $c_{22}$ and $c_{33}$) determine two families of intersecting circles, and thereby determine completely the nature of the topological transformation. It is immediately evident that this type of transformation does not have the desirous character of providing that the $x_2$-contours are also transformed into a family of circles with a common radius $L_2$. In Fig. 12 there appear sixty-four points of intersection of the $x_1$- and $x_3$-contours, distinguished by small circles. These are the transformed positions of the intersection in the original grid, and through them must pass the transformed contours of constant $x_2$. It will be observed that the intersections in the lower half of the grid lie on curves that are concave upward, whereas those in the upper half lie in curves (not shown) which are concave downward. By the symmetry of construction, the straight line $x_2=0$, must be transformed, not into a circle, but into the straight line $y=0$; the radii of curvature of the other $x_2$-contours increase as they approach this limiting straight line. The transformed ideal grid structure is not that of a star linkage. This grid structure, however, can be approximated by the nonideal grid structure of a star linkage, replacing the system of $x_2$-contours of the ideal grid structure by a system of approximating circles of the same radius.

It is possible to pass circles very nearly through the intersections in the lower half plane of Fig. 12 by choosing a mean value $L_2$ for the radius of curvature, and locating the centers of the circles in the upper half plane. This will establish the general position of the $x_2$-scale, and will make it necessary to pass through the intersections of the upper half plane circular arcs that are concave upward; the fit there cannot be very exact, and the errors of constructions must be split as well as possible.

The best way to do this is to construct a circle through one set of intersections to establish the radius $L_2$. (In Fig. 12, $E_0$ is the circle in question, and the radius chosen is just equal to $L_1$ and $L_3$.) With this radius, arcs can be constructed about each of the known grid intersections. If the grid structure under construction were to be ideal, the arcs characterized by a given value of $s=t-r$ would all intersect in a common point. In the present case, instead of points of intersection, there exist more or less diffuse points of intersection, within which there can be located with some degree of arbitrariness the centers of grid circles. This arbitrariness can be used to good advantage. If a simple mechanization of the grid structure is to be possible, the $x_2$-scale must lie in a simple curve, preferably a straight line or a circle. In the present case the regions of intersection lie roughly on a circle. In particular, the circular arc $e$, with center at $Q$, passes nicely through all regions of intersection except for three at the extreme ends. This circle will be taken as the $x_2$-scale on this scale, and as near to the centers of the regions of intersection as is possible, there are chosen centers $e_1$, $e_0$, $e_{-1}$ . . . of the grid structure circles $E_1$, $E_0$, $E_{-1}$, . . . , in the lower half plane, and the centers $f_1$, $f_0$, $f_{-1}$, . . . , of the grid structure circles $F_1$, $F_0$, $F_{-1}$, . . . , in the upper half plane. The grid structure circles must converge on a circle $E_{-\infty}=F_{-\infty}$ through the origin $O'$. The center of the circle $E_{-\infty}$ is $e_{-\infty} \equiv f_{-\infty}$, the point of condensation of the point sequence $e_s$ in the positive domain of $x_2$, and of the point sequence $f_s$ in the negative domain, as $s \to -\infty$; it is the zero point on the $x_2$ scale. This completes the determination of the constants of the star linkage.

Figure 13:
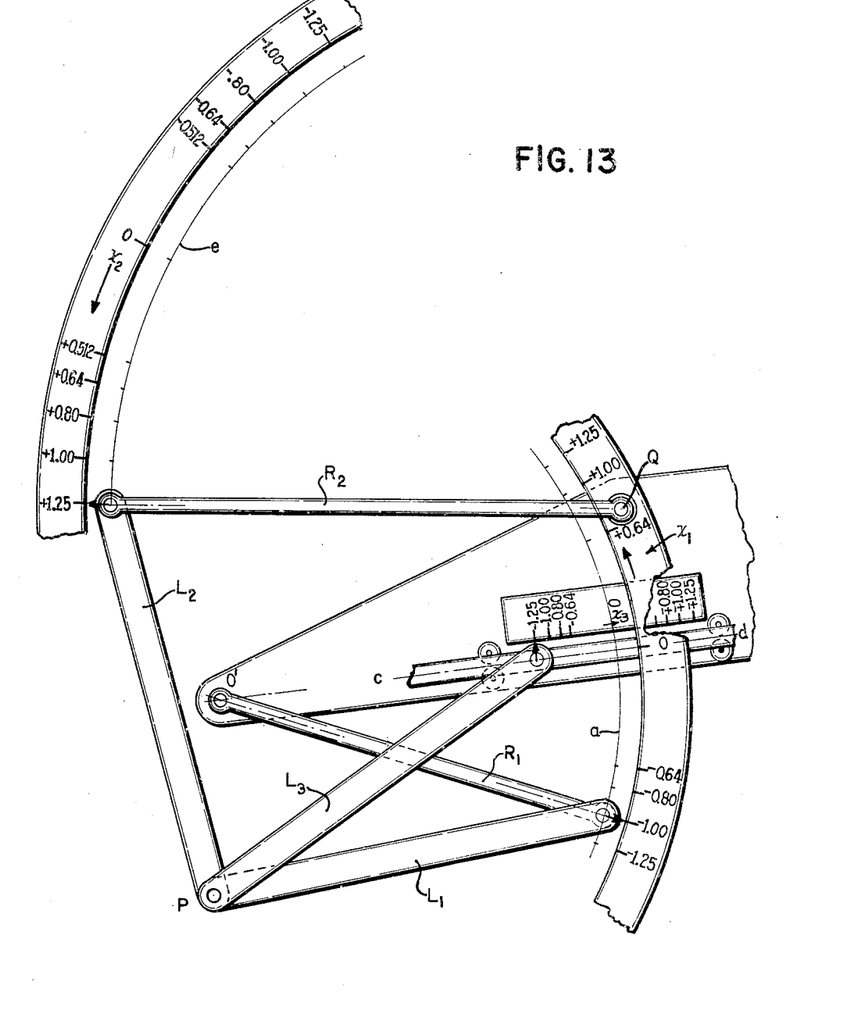
Fig. 13 is a mechanization of the grid structure of Fig. 12.

The grid structure of Fig. 12 is mechanized by the approximate multiplier shown in Fig. 13. This mechanism consists of a star grid generator with the arms $L_1$, $L_2$, and $L_3$, meeting at a common point $P$. The free end of $L_1$ is forced to move along a circle $a$ with the center $O'$, and the free end of $L_2$ along a circle $e$ with center $Q$, by arms $R_1$ and $R_2$, respectively. The free end of $L_3$ is constrained to move in a straight line by the slide $cd$. It follows from the foregoing discussion that the lengths of $L_1$, $L_3$, and $R_1$ must be equal; $L_2$ is also of the same length, but only accidentally. To use the apparatus of Fig. 13 as a multiplier, the scales must be calibrated in terms of the variables $x_1$, $x_2$, $x_3$, related to the indices $r$, $s$, and $t$. The scale points of Fig. 12 thus occur for values of $x_1$, $x_2$, $x_3$, which change in geometric progression; these are the scale calibrations shown in Fig. 13. It will be observed that the device computes the relations $x_3=x_1x_2$ over a considerable range with a rather high degree of accuracy.

Figure 14:
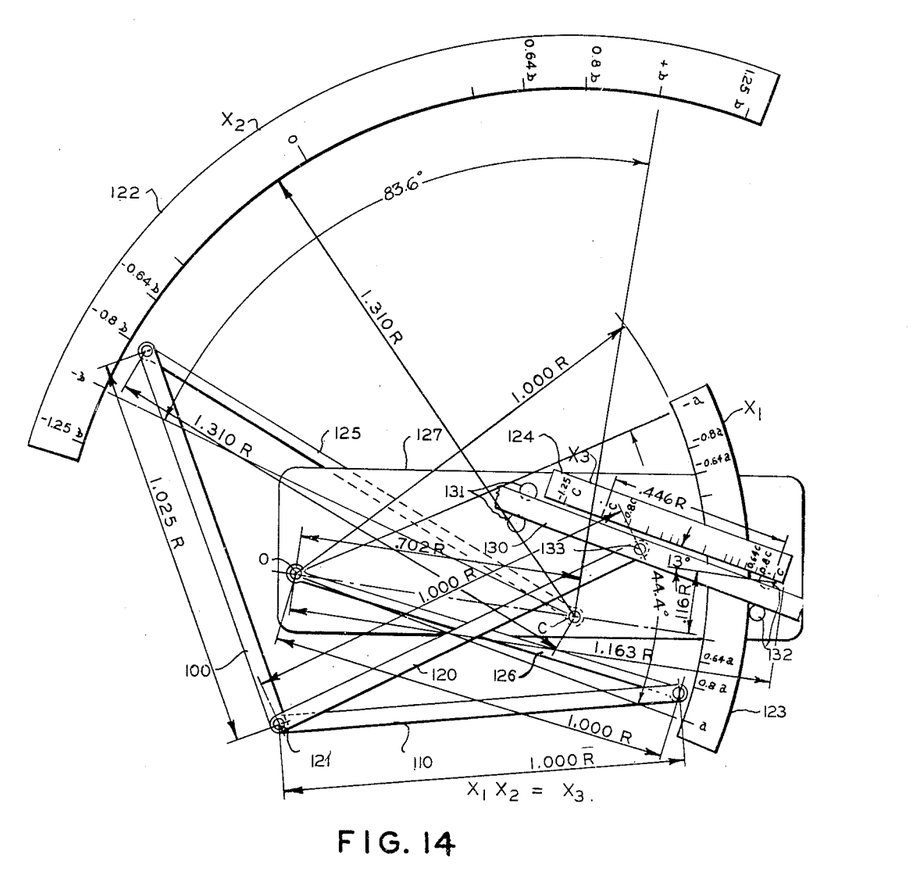
Fig. 14 is a modified mechanization of the grid structure of Fig. 12.

Referring now to Fig. 14, there is shown a computing device which is basically the same as that shown in Fig. 13 except that increased accuracy over the entire range of all scales has been obtained by changes in the dimensions of certain of the elements. The number and relations of the elements, however, remain unchanged. The mechanism consists of a star grid generator with the arms 100, 110, 120, meeting at a common pivot point 121 which correspond respectively to the arms $L_2$, $L_1$ and $L_3$ of Fig. 13 except that arm 100 has been made of slightly greater length than 110 and 120. The free end of arm 110 is forced to move along the circular $x_1$ scale 123 having the center $O$, and the free end of arm 100 along the circular $x_2$ scale 122 having a center $C$, by arms 126 and 125, respectively. (It will be observed that the position of the center $O$ of the $x_2$ scale of Fig. 14 is somewhat different from that of the center $Q$ of the $x_2$ scale of Fig. 13. This change increases the accuracy of the multiplier.) The free end of arm 120 is constrained to move in a straight line adjacent the $x_3$-scale 124 by a slide block 130 slidably mounted on base 127 by two pairs of rollers 131 and 132. The free end of arm 120 is pivotally connected to slide 130 by pin 133. Similar to the device of Fig. 13, the scales 123, 122 and 124 are calibrated in terms of the variable $x_1$, $x_2$ and $x_3$, respectively; namely, in such a manner that the scale divisions change in geometric progression. The ranges of the variables of the device of Fig. 13 has been changed in apparatus of Fig. 14. The readings on the $x_1$-, $x_2$-, and $x_3$-scales have been changed by the factors $a$, $b$, and $c$, respectively, the factors $a$, $b$, and $c$ being controlled by the relation $ab=c$. Assuming $R$ as a unit of length, the relative dimension of the elements of the computing device are as follows:

| | |
|---|---|
| Length of link 110 | 1.000 R |
| Length of link 120 | 1.000 R |
| Length of link 100 | 1.025 R |
| Length of bar 125 | 1.310 R |
| Length of bar 126 | 1.000 R |
| Distance from pivot point O to pivot point C | .702 R |
| Distance of one end of scale 124 along a line parallel to line OC from point O | 1.163 R |
| Distance of said end of scale 124 above line OC along a line perpendicular to line OC | .116 R |
| Angle between the longitudinal axis of scale 124 and line OC | 13° |
| Radius of scale 122 from point C | 1.310 R |
| Radius of scale 123 from point O | 1.000 R |

While particular embodiments of this invention have been disclosed and described, it is to be understood that the scope of the invention is not to be limited except as defined in the appended claims.

What is claimed is:

1. A mechanism for use in a computing mechanism for determining the product of the independent variables expressed by the equation $x_3=x_1x_2$, comprising a support, first, second, and third links of substantially unit length pivotally connected at a common point, a first scale of circular configuration mounted on said support and calibrated to indicate positive and negative values of input variable $x_1$, said first scale having scale divisions which vary in geometric progression on either side of a zero point, a second scale of circular configuration calibrated to indicate positive and negative values of input variable $x_2$, said second scale having scale divisions which vary in geometric progression, a third scale mounted on said support and calibrated to indicate positive and negative values of $x_3$, the scale divisions of said third scale varying in geometric progression along a straight line, a first constraining member pivoted to said support for forcing the free end of said first link to move along said second scale, a second constraining member pivoted to said support for forcing the free end of said third link to move along said first scale, and a block slidably mounted for relative parallel motion with respect to said third scale, the free end of said second link being pivotally attached to said block and forced to move along said third scale thereby, the relative lengths of said first and second constraining members with respect to said unit length first, second and third links being 1.1310 and 1.000, respectively.

2. A linkage mechanism for use in computing apparatus, comprising, a support, first, second and third arms pivotally connected at a common point, first and second circular scales calibrated to indicative positive and negative values of input variables $x_1$ and $x_2$, respectively, said scales having scale divisions which vary in geometric progression on either side of zero, and a third scale calibrated to indicate positive and negative values of a variable quantity $x_3$, said third scale having scale divisions which vary in geometric progression along a straight line on either side of zero, a first constraining member pivoted to said support for forcing the free end of said first arm to move along said second scale, a second constraining member pivoted to said support for forcing the free end of said third arm to move along said first scale, and means for moving the free end of said second arm along said third scale, in which the lengths of the arms and constraining members measured between pivot points bear the following relations to each other when the basis of comparison is taken as unity:

| | |
|---|---|
| First arm | 1.025 |
| Second arm | 1.000 |
| Third arm | 1.000 |
| First constraining member | 1.310 |
| Second constraining member | 1.000 | said dimensions being such that the movement of the constrained end of said second arm along said third scale closely approximates the product of the movement of the constrained ends of said first and third arms along said second and first scales, respectively, thereby to determine the relation $x_3=x_1x_2$, over a substantial range of movement of said first and third arms.

3. A linkage mechanism for use in computing apparatus, comprising a planar support, first, second and third arms pivotally connected together at a common point, first and second arcuate scales being positioned in cooperative relationship with said apparatus, said first and second scales being calibrated to indicate positive and negative values of input variables $X_1$ and $X_2$, respectively, and having scale dimensions which are spaced in accordance with a geometric progression on either side of zero, said first scale being calibrated from $-1$ to $+1$ and said second scale being calibrated from $-1.25$ to $+1.25$, a third scale of linear configuration being positioned in cooperative relationship with said apparatus and calibrated to indicate positive and negative values of an output variable $X_3$, said third scale having scale divisions which are spaced in accordance with a geometric progression from $-1.25$ to $+1$, a first constraining member pivoted to said support for forcing the free end of said first arm to move along said second scale, a second constraining member pivoted to said support for forcing the free end of said third arm to move along said first scale, and means for moving the unpivoted end of said second arm along said third scale, the lengths of said arms and constraining members measured between pivot points bearing the following dimensional relation to each other when the basis of comparison is taken as unity:

| | |
|---|---|
| First arm | 1.025 |
| Second arm | 1.000 |
| Third arm | 1.000 |
| First constraining member | 1.310 |
| Second constraining member | 1.000 | said dimensions being such that the movement of the unpivoted end of said second arm closely approximates the product of the movement of the constrained ends of said first and third arms along said second and first scales, respectively, thereby to determine the relation $X_3=X_1X_2$ over the range of movement of said first and third arms, the aforementioned arms, members, and scales having the following orientation when the basis of comparison is taken as unity:

| | |
|---|---|
| Distance between the points of attachment to said support of said first and second constraining members along a line joining said points | .702 |

Perpendicular distance between a line drawn through the points of attachment of said first and second constraining members to said support and a line drawn parallel thereto through the +1 calibration of said third scale ------ .116

Angle between the said parallel line drawn through the +1 calibration of said third scale and the axis of said third scale ----- 13°

Distance along a line drawn through the points of attachment of said first and second constraining members to said support between the point of attachment of said second constraining member and the +1 calibration of said third scale -------- 1.163

Length of said third scale between the +1 and −1 calibration points thereof -------- .446

Angle along said first scale between the +1 and −1 calibration points thereof -------- 44.4°

Angle along said second scale between the +1 and −1 calibration points thereof --- 83.6°

4. A linkage mechanism for use in computing apparatus, comprising, a planar support, first, second and third arms pivotally connected together at a common point, first and second arcuate scales, said first and second scales being calibrated to indicate positive and negative values of independent input variables $X_1$ and $X_2$, respectively, and having scale dimensions thereon which are spaced in accordance with a geometric progression on either side of a zero position, said first scale being calibrated with values from $-a$ to $+a$ and said second scale being calibrated with values from $-1.25b$ to $+1.25b$, a third scale of linear configuration being mounted on said support and having calibrations thereon to indicate positive and negative values of a dependent output variable $X_3$, said third scale having scale divisions thereon which are spaced in accordance with a geometric progression from $-1.25c$ to $+c$, the relation between the said quantities $a$, $b$ and $c$ being $ab=c$, a first constraining member pivotally attached at one end to said support and at the other end to the free end of said first arm to move the free end of said first arm along said second scale, a second constraining member pivotally attached at one end to said support and at the other end to the free end of said third arm to move the free end of said third arm along said first scale, and a sliding member mounted for reciprocating movement in parallel juxtaposition with said third scale, the free end of said second arm being pivotally attached to said sliding member, said arms and members having the following relative dimensions and orientation when the basis of comparison is taken as R, R being an arbitrary unit of length:

Length of said first arm ---------------- 1.025 R
Length of said second arm -------------- 1.000 R
Length of said third arm --------------- 1.000 R
Length of said first constraining member 1.310 R
Length of said second constraining member ---------------------------- 1.000 R
Distance between the points of attachment to said support of said first and second constraining members along a line joining said points ---------------- .702 R
Perpendicular distance between a line drawn through the points of attachment of said first and second constraining members to said support and a line drawn parallel thereto through the +c calibration point of said third scale --- .116 R
Angle between the said parallel line drawn through the +c calibration of said third scale and the axis of said third scale --------------------------- 13°
Distance along a line drawn through the points of attachment of said first and second constraining members to said support between the point of attachment of said second constraining member and the +c calibration point of said third scale --------------------- 1.163 R
Length of said third scale between the +c and −c calibration points thereof ------ .446 R
Angle along said first scale between the +a and −a calibration points thereof --- 44.4°
Angle along said second scale between the +b and −b calibration points thereof --- 83.6° the aforementioned dimensions and orientations providing that the movement of the said free end of said second arm closely approximates the product of the movement of the constrained ends of said first and third arms along said second and first scales, respectively, thereby to determine the relation $X_3 = X_1 X_2$.

ANTONIN SVOBODA.

REFERENCES CITED

The following references are of record in the file of this patent:

UNITED STATES PATENTS

| Number | Name | Date |
| --- | --- | --- |
| 2,229,156 | Wertheimer | Jan. 21, 1941 |
| 2,272,256 | Vogt | Feb. 10, 1942 |
| 2,394,180 | Imm | Feb. 5, 1946 |

FOREIGN PATENTS

| Number | Country | Date |
| --- | --- | --- |
| 367,642 | Germany | Jan. 25, 1923 |
| 512,073 | Germany | Nov. 6, 1930 |
| 566,565 | Germany | Dec. 19, 1932 |
| 710,028 | France | May 26, 1931 |
| 357,940 | Italy | April 1, 1938 |
| 144,893 | Switzerland | May 16, 1931 |